United States Patent Office 3,518,072
Patented June 30, 1970

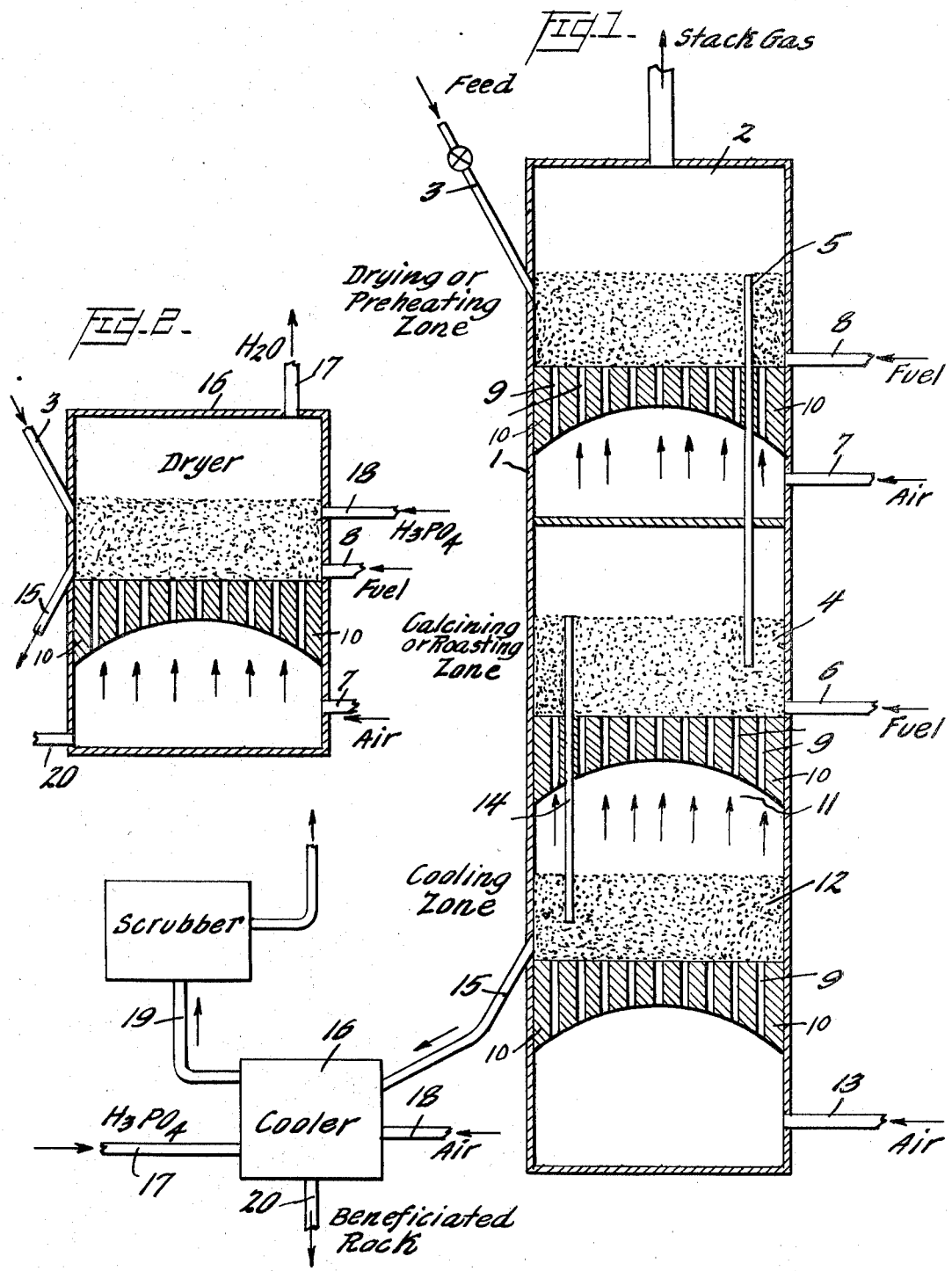

3,518,072
BENEFICIATION TREATMENT OF PHOSPHATE ROCK FOR PREPARATION OF FERTILIZERS AND OTHER PRODUCTS
John G. Kronseder, 27 Pumpkin Hill, and David W. Leyshon, 110 Cross Highway, both of Westport, Conn. 06880
Filed Nov. 3, 1966, Ser. No. 591,728
Int. Cl. C05b 1/00, 17/00
U.S. Cl. 71—41                                        4 Claims

ABSTRACT OF THE DISCLOSURE

Phosphate rock having a $CaO/P_2O_5$ ratio in excess of 1.50 is beneficiated in a fluidized bed reactor having a plurality of superposed treatment zones to increase the BPL content and lower the $CaO/P_2O_5$ ratio of the rock. Rock to be treated is initially preheated, calcined at a temperature of from 1200° to 1850° F. and cooled to from 600° to 1200° F. Thereafter, the thus cooled rock is treated with phosphoric acid having $P_2O_5$ content from 20 to 40% to further cool the calcined rock to a temperature of from 220° to 550° F. and simultaneously beneficiate the rock.

---

This invention relates to a process for treating low grade phosphate rock for producing valuable products therefrom.

One advantage of this invention is to both upgrade the low grade phosphate rock and cool it, subsequent to calcination treatment.

Increasing world demand for the preparation of fertilizers and other products utilizing phosphoric acid in their preparation has created a serious drain on the rapidly diminishing world sources of high grade phosphate rock. A necessary corollary and consequence of this has been the increased dependence by the manufacturer of phosphoric acid on the use of low grade phosphate rock.

These lower grades of phosphate rock must first be thoroughly beneficiated in order to bring them up to processible grade before they can be subjected to acid generating treatment.

As long as this added beneficiation can be performed within economical limits, these ores can be profitably utilized in phosphoric acid manufacture. The best of these low grade ores can usually be economically processed to about 72% BPL (bone phosphate of lime), which is a commodity recognized in international trade as a shipping grade rock. The marginal grades require more extensive treatment but in general the cost of beneficiating these marginal grade rocks exceeds the value of the rock in the world markets.

One technique commonly employed to beneficiate phosphate rock is to subject the rock, which has been comminuted to proper size, to combustion or calcination treatment in a fluidized bed reactor to remove certain contaminants which interfere with the subsequent wet processing of the phosphate rock to phosphatic fertilizers.

After calcination, the phosphate rock is cooled so that it may be conveniently handled. This cooling is accomplished by spraying water directly on the rock. While this technique is effective for eliminating the organic contaminants in the rock it does not improve the percent BPL content of the rock.

Accordingly it is an object of this invention to combine calcination treatment of phosphate rock with a novel cooling operation so that the combined processes yield an improved product that has been upgraded as well as cooled.

Another object of this invention is to provide a process for producing high grade phosphate rock while eliminating losses of $P_2O_5$ and at the same time providing a more efficient, simple process with a minimum of steps at an economically feasible cost.

An important object of this invention is to produce a 75% BPI rock, or better, starting with raw phosphate rock in the sixty-six to seventy percent BPI range.

Another object of this invention is to eliminate sulphide sulphur present in the low grade rock so as to reduce corrosion in subsequent treatments.

It is another object of this invention to substantially reduce free calcium oxide and to provide a phosphate rock product with a $CaO/P_2O_5$ ratio of approximately 1.50 or less, preferably 1.35 to 1.45.

In the practice of this invention it has been surprisingly found that any conventional, low grade phosphate rock, preferably in the 60 to 70% BPI range, that is mined in the general range of −20 to +200 mesh (Tyler), or alternately can be first crushed and/or ground to produce a crushed rock in the general range of −20 to +200 mesh (Tyler) followed by calcination and subsequent cooling with phosphoric acid to yield a beneficiated rock product high in $P_2O_5$ and relatively low in CaO content. This process results in an upgrading of the rock during the cooling process.

In an alternative process, according to another embodiment of this invention phosphoric acid may be added to and during a drying operation after all or a part of the water is evaporated from the rock so as to reduce calcium oxide/$P_2O_5$ ratio and upgrade the rock.

Any phosphate rock conventionally used without regard of geographic origin for producing phosphoric acid, particularly including North Carolina and North African rock, both of which are high in calcium oxide, may be used in the practice of this invention. Western United States and middle east rock like that of Jordan are also high in CaO. Florida, Tennessee, Baja Mexico, California minerals, etc., may likewise be beneficiated by this process of this invention.

Although the processes of this invention are primarily directed to any phosphate rock, particularly those from the sources indicated above, they are especially applicable and most beneficial to those phosphate containing rocks that have a BPL in the range of 66 to 70°. Of course, it will be readily apparent to one skilled in the art that this invention may be applied to any phosphate material including those materials that have a higher or lower BPL range.

This invention has particular application to phosphate rock containing lattice $CO_2$ where $CaCO_3$ substitutes for $Ca_3(PO_4)_2$ in the rock. This type of CaO cannot be removed by conventional beneficiation techniques.

Prior to calcining or drying the phosphate rock should be crushed or otherwise comminuted if not mined at the sizes indicated above to pass a 20 and is retained on a 200 mesh screen (Tyler series). In the next step the rock is preferably subjected to a calcination or high temperature roasting treatment as is conventional in the art. In the practice of this invention any conventional calciner or furnace may be used wherein a temperature of 1200 to 1850° F. may be maintained so as to completely calcine or roast the finely divided or crushed phosphate rock for a period ranging from about ten minutes to two hours, as desired.

This invention will now be described by way of example with reference to the accompanying drawings in which:

FIG. 1 illustrates a three-stage fluidized bed calciner and cooler as one form of the apparatus that may be used to practice the preferred embodiment of this invention. The three stages are a preheat or drying zone, a calcining zone and an air cooling zone.

FIG. 2 illustrates the application of the invention to a fluidized bed dryer.

Into an upright fluid bed reactor 1 phosphate feed rock particles of the proper size, as indicated above, is fed into a drying or preheat zone 2 by means of a conduit or pipe 3. Preheated or dried solids are transferred, by gravity to calcining or roasting zone 4 by conduit 5. Fuel and air enter this preheat or drying fluid bed zone through conduits 8 and 7, respectively. Air that enters through line 7 flows up and through apertures 9 in support 10 to act as a fluidizing gas, and the fuel burns in the presence of said air. After being heated to a temperature in the range of 200 to 1200° F. in preheat zone 2, the comminuted rock overflows into conduit 5 and enters the intermediate fluidized bed of calcining or roasting zone 4 where the rock particles are heated to a temperature ranging from about 1200 to 1850° F. The increased temperature may be maintained in zone 4 by passing air that has been preheated in cooling zone 11 by fluid bed 12 upward through apertures 9 along with fuel that enters through line 6. This preheated air that enters zone 4 acts as the fluidizing gas for the fluid bed for the calcining of the rock particles and for the burning of the fuel. Ambient or low temperature air is pumped into the reactor through line 13 and flows up through apertures 9 to cool the rock particles that overflow from the fluid bed calciner through conduit 14. The rock particles are usually air cooled to a temperature in the range of 600 to 1200° F. in zone 11 and are then transferred by gravity conduit 15 or other conventional means to a cooler 16. The cooler 16 may comprise a conventional rotary screw or fluid bed or other cooler. A fluid bed cooler may be preferred to avoid high temperatures or fumes as an alternative to a rotary screw cooler or any other cooler. Phosphoric acid in a concentration of 20 to 40 weight percent in a quantity ranging from 2 to 20 pounds per 100 pounds of rock particles is pumped into the cooler 16 which comprises a supplementary cooling zone. It may be sprayed in, for example, on a batch or continuous basis through line 17. This phosphoric acid used for cooling and beneficiating the rock is usually in the range of 60 to 180° F. Air may also be pumped into cooler 16 through line 18. Hot phosphoric acid liquid or vapors with impurities or condensate may be removed from cooler 16 through line 19 to a conventional scrubber and the upgraded rock at a temperature usually in the range of 250 to 400° F. may be removed through line 20.

FIG. 2 illustrates another embodiment of the invention where the above described phosphoric acid is added to phosphate rock particles that are drying at a temperature in the range of 200 to 500° F., more preferably at a temperature in the range of 300 to 400° F. It is also preferred that the phosphoric acid be added after any water present in the rock particles is evaporated. Phosphate feed rock particles are fed into dryer 36, that may be a fluid bed or other conventional dryer by line 3. Air and fuel may be fed in through lines 7 and 8 respectively. Water vapor or steam may be removed from dryer 16 through line 17 and phosphoric acid may be added through line 18. Cooled and beneficiated phosphate rock may be removed through line 15 and any liquid acid or residue may be removed through line 20.

When a multiple stage fluid bed calciner is used to practice this invention a small quantity of the aforesaid phosphoric acid, particularly a 30 percent acid may be added to the upper zone of the calciner in a quantity varying from about 1 to 5 pounds of acid per hundred pounds of rock and by combining this step with the phosphoric acid cooling step described above, sulfide sulfur can be materially reduced in the final calcined product.

It is also preferred to spray the phosphoric acid, cooling agent into the cooler in a manner similar to the addition in the present cooling systems in use in the prior art. It is also preferred to use a closed cooling system as considerable quantities of the $H_3PO_4$ may be vaporized or evaporated by the sensible heat from the hot calcined phosphate mineral. If any phosphoric acid is evaporated it may be condensed in conventional apparatus and recycled to the cooler or to the original supply so as to provide a cyclic system. Any drum, screw or conventional cooling apparatus or device as set forth above may be used so long as the final product temperature, i.e., the phosphate rock and the phosphoric acid that is removed from the cooler is at a temperature high enough to remove all water soluble $P_2O_5$. This temperature should usually be in the range of about 220 to 550° F.

This following example is presented as a mere illustration of the invention and is not intended as limitative thereof:

EXAMPLE

This example illustrates the treatment of a low grade North Carolina phosphate rock BPL 67 percent to produce a rock having a BPL of approximately 76% and at the same time improving the $CaO/P_2O_5$ ratio. One hundred parts by weight of this sixty-seven percent BPL, phosphate rock of North Carolina origin was fed into a three stage calciner as shown in FIG. 1 at an average size of −20 mesh and had the following analysis (dry basis) prior to treatment:

| | |
|---|---|
| $P_2O_5$ | 30.6 |
| CaO | 48.3 |
| F | 3.7 |
| $Al_2O_3$ | 0.38 |
| $SO_3$ | 1.6 |
| $CO_2$ | 5.65 |
| $Fe_2O_3$ | 0.70 |
| $SiO_2$ | 3.0 |

$CaO/P_2O_5$ ratio of 1.6.

This phosphate rock was treated in a fluidized bed calciner at a temperature of 1450° F. in a continuous process where residence time was essentially one hour after which the phosphate rock was withdrawn from the air cooling zone at a temperature of approximately 1000° F. and cooled in a rotary cooler by spraying in 15 pounds of 30 percent phosphoric acid per 100 pounds of rock, at 100° F. to reduce the temperature of the rock taken from the cooler to approximately 550° F. The phosphate rock removed from the cooler had a $CaO/P_2O_5$ ratio of approximately 1.4 ($P_2O_5$ approximately 34 percent).

An additional number of tests were run using the same type of three-stage calciner wherein a 27 percent phosphoric acid was used to cool 100 grams of a phosphate rock feed material of the following weight percent composition:

| | Percent |
|---|---|
| CaO | 48.3 |
| $P_2O_5$ | 30.6 |

Ratio of $CaO/P_2O_5$ 1.58

The pertinent data and results of these tests are set forth in the following table:

TABLE I

| Temperature Maintained During Cooling | Grams Acid | Grams $P_2O_5$ in Acid | Detention Time in Cooling Step (minutes) | Product Weight Percent CaO | $P_2O_5$ | Ratio $CaO/P_2O_5$ |
|---|---|---|---|---|---|---|
| 220° F | 15 | 4.0 | 30 | 49.7 | 35.6 | 1.40 |
| 220° F | 10 | 2.7 | 30 | 50.6 | 34.9 | 1.45 |
| 220° F | 5 | 1.3 | 30 | 51.0 | 34.0 | 1.50 |
| 550° F | 15 | 4.0 | 60 | 49.1 | 35.0 | 1.41 |
| 550° F | 10 | 2.7 | 60 | 50.6 | 34.9 | 1.45 |
| 550° F | 5 | 1.3 | 60 | 51.0 | 34.6 | 1.47 |

What is claimed is:
1. A method for beneficiating phosphate rock having a CaO/P$_2$O$_5$ ratio in excess of 1.50 in a fluidized bed wherein the rock moves countercurrent to the uprising fluidizing gases comprising establishing a plurality of superposed fluidized bed treatment zones including an upper preheating zone, an intermediate calcination zone and a lower cooling zone, feeding comminuted phosphate rock having a particle size in the range of from −200 to +200 Tyler mesh to said upper preheat zone to provide a bed therein, supplying fuel to said bed, preheating said phosphate rock bed to a temperature in the range of about 200° to 1200° F. by burning said fuel in the presence of air passing upwardly through said bed to fluidize the same, transferring the thus preheated rock by gravity overflow from said fluidized bed in the upper preheating zone to said calcination zone, forming a bed therein of preheated phosphate rock, calcining said phosphate rock in said calcination zone at a temperature in the range of about 1200° to 1850° F. for a period ranging from about 10 minutes to 2 hours by the combustion of fuel supplied to said calcining bed in the presence of preheated air passing from the cooling zone upwardly through said calcining bed to fluidize the same; transferring hot calcined rock from said calcination zone to said cooling zone by gravity overflow, to form a bed of calcined phosphate rock in the latter zone, cooling said rock to a temperature of from about 600° to 1200° F. with relatively cool air at ambient temperature, said air being preheated by passing upwardly through said cooling zone bed, said preheated air then passing upwardly through said calcining zone bed to thereby fluidize the cooling zone bed and the calcining zone bed as aforesaid, withdrawing the relatively cooled calcined phosphate rock from said cooling zone to a supplementary cooling zone, adding phosphoric acid at a temperature in the range of about 60° to 180° F., said acid having a P$_2$O$_5$ content from about 20 to 40% by weight, to said withdrawn calcined rock in amounts sufficient to cool said calcined rock in the supplementary cooling zone to a temperature of from about 220° to 550° F., thereby simultaneously beneficiating said rock by increasing its BPL content and lowering its CaO/P$_2$O$_5$ ratio to a level below 1.50.

2. The method of claim 1 wherein from 2 to 20 pounds of phosphoric acid are added per 100 pounds of calcined rock.

3. The method of claim 1 wherein the phosphate rock contains sulphide sulphur, and about 1 to 5 pounds of phosphoric acid of 30% concentration is added per 100 pounds of phosphate rock, to the upper preheat zone to reduce the sulphide sulphur in the final calcined product.

4. The method of claim 1 wherein the phosphate rock BPL content is within the range of 66 to 70% and sufficient phosphoric acid is added to the withdrawn calcined phosphate rock to raise the BPL content of the final calcined rock product to a value of at least 75%.

References Cited
UNITED STATES PATENTS

| | | | |
|---|---|---|---|
| 1,706,101 | 3/1929 | Blumenberg | 71—33 XR |
| 1,910,617 | 5/1933 | Leu | 71—41 |
| 2,442,969 | 6/1948 | Butt | 71—41 XR |
| 3,364,008 | 1/1968 | Hollingsworth et al. | 71—41 |
| 3,376,124 | 4/1968 | Hollingsworth | 71—41 XR |
| 3,389,959 | 6/1968 | Lee | 71—33 XR |

REUBEN FRIEDMAN, Primary Examiner

B. H. LEVENSON, Assistant Examiner

U.S. Cl. X.R.

75—1